(12) United States Patent
Kato

(10) Patent No.: US 8,638,464 B2
(45) Date of Patent: Jan. 28, 2014

(54) COLLECTING HISTORY INFORMATION OF AN IMAGE FORMING DEVICE WHILE THE IMAGE FORMING DEVICE IS IN A POWER SAVING MODE

(75) Inventor: Kazunori Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 13/472,010

(22) Filed: May 15, 2012

(65) Prior Publication Data

US 2012/0300254 A1 Nov. 29, 2012

(30) Foreign Application Priority Data

May 23, 2011 (JP) ................. 2011-114762

(51) Int. Cl.
*G06F 3/12* (2006.01)
(52) U.S. Cl.
USPC ......... 358/1.15; 358/1.16; 713/300; 713/320; 713/340
(58) Field of Classification Search
USPC ................. 358/1.15, 1.16; 713/300, 320, 340
See application file for complete search history.

(56) References Cited

U.S. PATENT DOCUMENTS

| 2010/0033586 | A1 | 2/2010 | Kim | |
| 2011/0235108 | A1* | 9/2011 | Kato | 358/1.15 |

FOREIGN PATENT DOCUMENTS

| JP | 2005-215856 A | 8/2005 |
| JP | 2007-223275 A | 9/2007 |
| JP | 2008-015799 A | 1/2008 |

* cited by examiner

*Primary Examiner* — Eric A Rust
(74) *Attorney, Agent, or Firm* — Canon USA, Inc., IP Division

(57) ABSTRACT

A management apparatus according to the present invention controls whether history information is requested when it is specified that an image forming apparatus as an acquisition target of the history information is in a power saving state. When a return notification from the power saving state is issued after the image forming apparatus as the target requests previous history information, even in the power saving state of the image forming apparatus, the request is issued. The request is not issued when the image forming apparatus does not issue the return notification after the image forming apparatus as the target requests previous history information.

6 Claims, 12 Drawing Sheets

| HISTORY ID (701) | DEVICE ID (702) | TYPE (703) | START TIME (704) | END TIME (705) | NUMBER OF PAGES (706) | DOCUMENT NAME (707) | |
|---|---|---|---|---|---|---|---|
| 1000 | MULTIFUNCTION PERIPHERAL A | COPY | 2009/9/25 14:25 | 2009/9/25 14:40 | 4 | - | ~711 |
| 1001 | MULTIFUNCTION PERIPHERAL A | PRINT | 2009/9/26 9:01 | 2009/9/26 9:10 | 1 | a.doc | ~712 |
| 1002 | MULTIFUNCTION PERIPHERAL A | COPY | 2009/9/26 9:10 | 2009/9/26 9:10 | 5 | - | ~713 |
| 1003 | MULTIFUNCTION PERIPHERAL B | PRINT | 2009/9/26 10:12 | 2009/9/26 10:13 | 10 | p.pdf | ~714 |

FIG.7

| HISTORY ID | DEVICE ID | TYPE | START TIME | END TIME | NUMBER OF PAGES | DOCUMENT NAME |
|---|---|---|---|---|---|---|
| 1000 | MULTIFUNCTION PERIPHERAL A | COPY | 2009/9/25 14:25 | 2009/9/25 14:40 | 4 | – |
| 1001 | MULTIFUNCTION PERIPHERAL A | PRINT | 2009/9/26 9:01 | 2009/9/26 9:10 | 1 | a.doc |
| 1002 | MULTIFUNCTION PERIPHERAL A | COPY | 2009/9/26 9:10 | 2009/9/26 9:10 | 5 | – |
| 1003 | MULTIFUNCTION PERIPHERAL B | PRINT | 2009/9/26 10:12 | 2009/9/26 10:13 | 10 | p.pdf |

| DEVICE ID | on | sleep | wakeup | off | |
|---|---|---|---|---|---|
| MULTIFUNCTION PERIPHERAL A | 2009/9/26 08:35:11 | 2009/9/26 10:09:13 | 2009/9/25 17:35:14 | 2009/9/25 18:35:15 | ~811 |
| MULTIFUNCTION PERIPHERAL B | 2009/9/26 08:45:41 | 2009/9/26 10:07:13 | 2009/9/26 10:05:34 | 2009/9/25 17:35:45 | ~812 |
| MULTIFUNCTION PERIPHERAL C | 2009/9/26 10:09:15 | 2009/9/25 16:35:13 | 2009/9/25 16:35:13 | 2009/9/26 10:00:15 | ~813 |

FIG.9

| DEVICE ID | FINAL POLLING | PRE-POLLING MODE | |
|---|---|---|---|
| MULTIFUNCTION PERIPHERAL A | 2009/9/26 10:00:08 | running | ~911 |
| MULTIFUNCTION PERIPHERAL B | 2009/9/26 10:00:10 | running | ~912 |
| MULTIFUNCTION PERIPHERAL C | 2009/9/26 09:50:33 | sleep | ~913 |

901  902  903

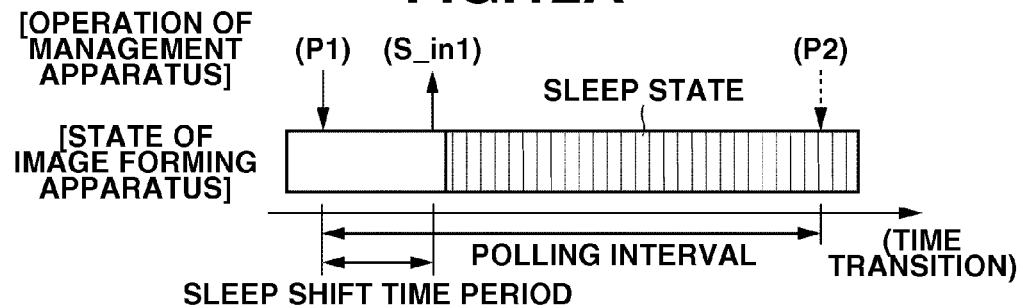
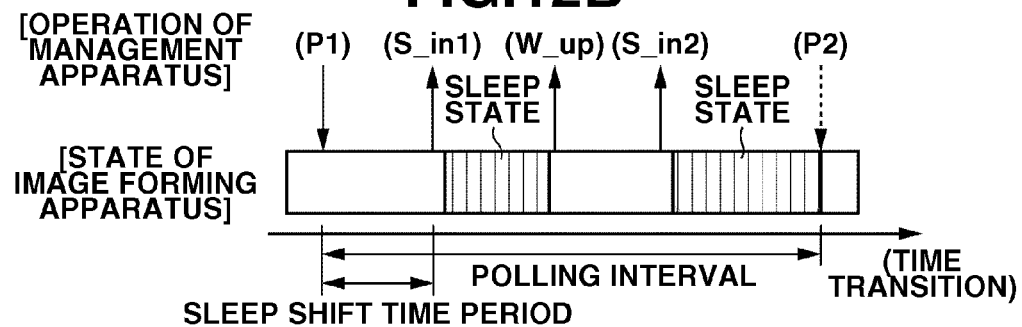
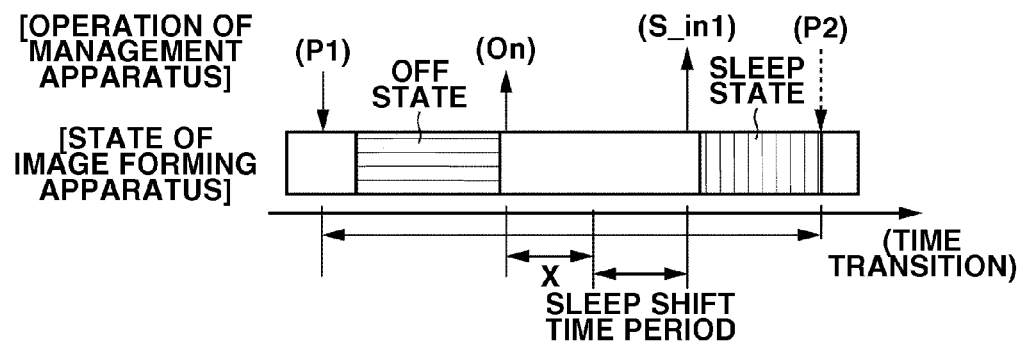
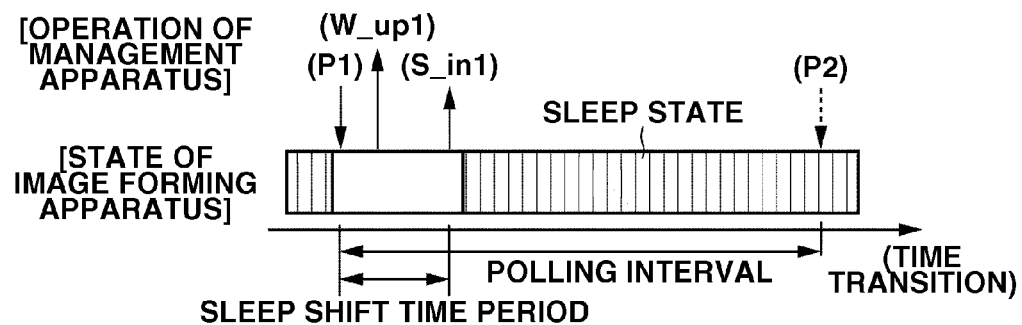

COLLECTING HISTORY INFORMATION OF AN IMAGE FORMING DEVICE WHILE THE IMAGE FORMING DEVICE IS IN A POWER SAVING MODE

BACKGROUND OF THE INVENTION

1. Field of the Invention

The present invention relates to a technique for managing an image forming apparatus such as a printer, a scanner, a facsimile machine, or a copying machine.

2. Description of the Related Art

In an image forming apparatus, if a user executes a job such as print or copy, a job history containing a user name or a used amount of the job is recorded. The management apparatus that manages the image forming apparatus collects and stores the job history from the image forming apparatus with polling processing.

Recently, energy saving has been advanced in offices and, if a job is being executed or there is no access from the management apparatus for a predetermined time or more, the state of an image forming apparatus is shifted to a power saving state for suppressing power consumption, such as a sleep state, in general image forming apparatuses.

Further, Japanese Patent Application Laid-Open No. 2008-015799 discusses a technique for managing whether a device as a management target is in a sleep state by a management apparatus, and preventing the device from being restored from the sleep state by an access from the management apparatus.

In general, when collecting history information such as a job history from the image forming apparatus with polling processing of the management apparatus, if the image forming apparatus is in the sleep state, the sleep state is cancelled. Therefore, if the image forming apparatus is in the sleep state, it is preferably to be controlled so that the management apparatus does not acquire history information in the sleep state but acquires history information in a state other than the sleep state.

However, when executing the polling processing of the management apparatus with a schedule of one time a day, if the image forming apparatus is in the sleep state at the polling timing, the management apparatus cannot collect the history information.

When the user of the image forming apparatus does not instruct to execute the job just before the polling timing or when the sleep state of the image forming apparatus continues thereafter, the management apparatus cannot collect the history information.

In the management apparatus, it is required to monitor a using situation of the user of the image forming apparatus in real time. Therefore, with an operation without acquiring the history information when the image forming apparatus is in the sleep state, the real-time property is lost in collecting the history information of the management apparatus.

SUMMARY OF THE INVENTION

The present invention is directed to a management apparatus and method capable of achieving real-time property of collecting the history information of the management apparatus and the power saving of the image forming apparatus.

According to an aspect of the present invention, an apparatus that manages history information acquired by issuing a request to an image forming apparatus, includes a reception unit configured to receive a shift notification indicating shift to a power saving state and a return notification indicating return from the power saving state from the image forming apparatus, a request unit configured to request history information to the image forming apparatus, a history information management unit configured to manage the history information acquired in response to the request, a management unit configured to manage time information indicating shift to the power saving state of the image forming apparatus in response to the received shift notification, time information indicating return from the power saving state of the image forming apparatus in response to the received return notification, and time information when requesting the history information to the image forming apparatus, a specification unit configured to specify whether the image forming apparatus is in the power saving state by referring to the time information indicating the shift to the power saving state and the time information indicating the return from the power saving state, managed by the management unit, and a control unit configured to control whether the request unit issues the request when the specification unit specifies that the image forming apparatus as an acquisition target of the history information is in the power saving state. The control unit controls to issue the request by the request unit even in the power saving state of the image forming apparatus when the time information of the previous request of the image forming apparatus as the target managed by the management unit is compared with the time information indicating the return from the power saving state and the return is notified after the image forming apparatus issues the previous request, and does not control to issue the request by the request unit when the return is not notified after the image forming apparatus issues the previous request.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a history information management table.

FIG. 9 illustrates an example of a polling management table.

FIGS. 12A to 12D are conceptual diagrams illustrating operations of the management apparatus according to a state of the image forming apparatus.

DESCRIPTION OF THE EMBODIMENTS

Various exemplary embodiments, features, and aspects of the invention will be described in detail below with reference to the drawings.

Figure 1:
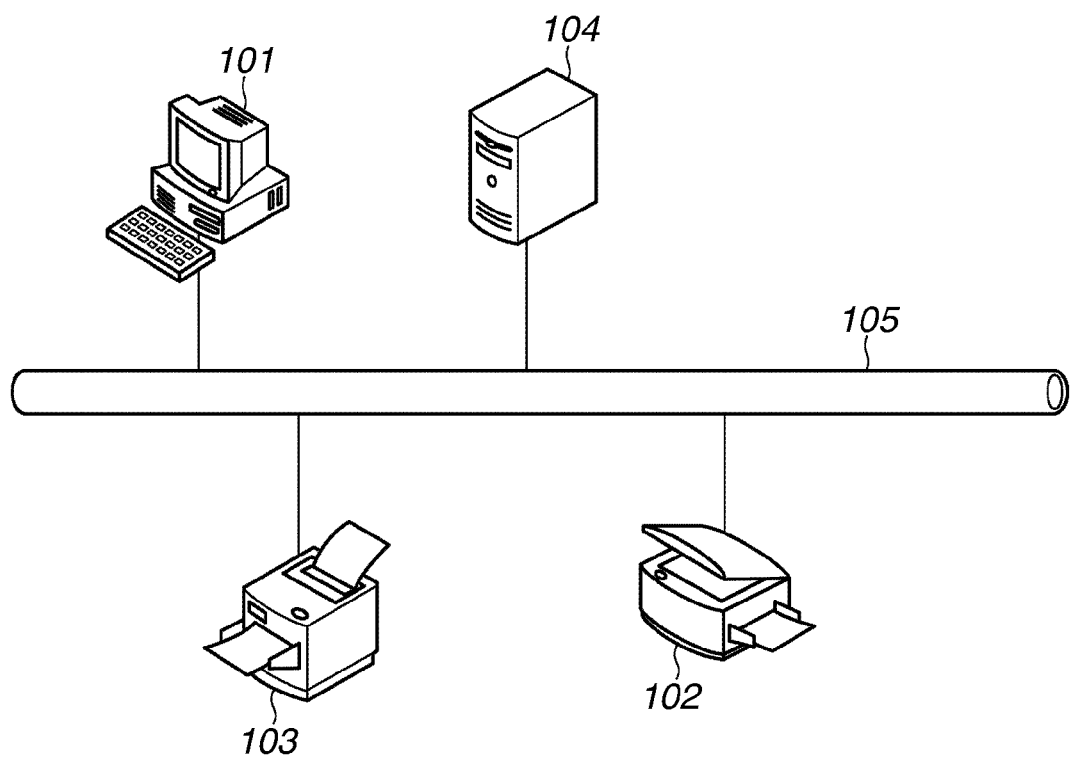
FIG. 1 is a diagram illustrating a configuration example of a management system according to an exemplary embodiment of the present invention.

FIG. 1 is a block diagram illustrating a configuration example of a management system according to an exemplary embodiment of the present invention. The management system includes a host computer 101, a multifunction peripheral 102, a printer 103, and a management apparatus 104. The apparatuses in the management system are connected to be communicable with each other via a network 105 configured by a well-known technique such as Ethernet (registered trademark).

The host computer 101 receives a print instruction of a user, generates print data including image data, and transmits the generated data as a print job to the network 105.

The multifunction peripheral 102 and the printer 103 receive the print job via the network 105, and print data on a sheet with a well-known print technique such as an electrophotographic technique or an inkjet technique. The multifunction peripheral 102 executes a scanner job for reading a paper document via a scanner, a copy job for printing out image data scanned and read, or a send job for sending the read image data by email.

Further, the multifunction peripheral 102 executes a facsimile (FAX) job for transmitting or receiving FAX data. The multifunction peripheral 102, to which the present invention can be applied, may include at least one of a scanner function, a print function, a send function, and a FAX function.

The multifunction peripheral 102 and the printer 103 store a job history indicating a history of execution of various jobs or an operation history indicating a history of an operation content such as log-in of the user to a storage device thereof. The management apparatus 104 collects and manages history information containing the job history from the image forming apparatus such as the multifunction peripheral 102 or the printer 103.

According to the present exemplary embodiment, the management apparatus 104 is provided independently of the host computer 101. Alternatively, a module having the similar function may be disposed in the host computer 101.

Figure 2:
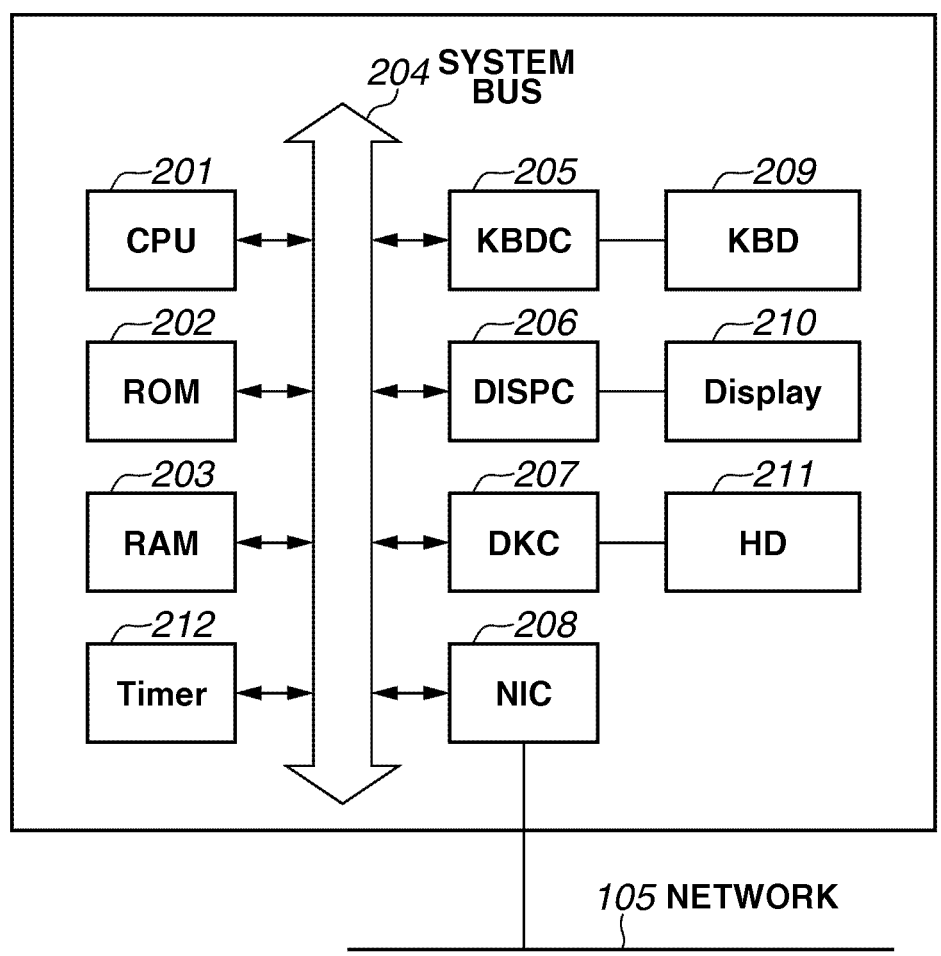
FIG. 2 is a block diagram illustrating an internal configuration of a host computer.

FIG. 2 illustrates an internal configuration (hardware configuration) of the host computer 101. The host computer 101 includes a central processing unit (CPU) 201 that executes software programs stored in a read only memory (ROM) 202 or a hard disk (HD) 211 as a large-scaled storage device.

The CPU 201 collectively controls devices connected to a system bus 204. A random access memory (RAM) 203 functions as a main memory or a work area of the CPU 201. A keyboard controller (KBDC) 205 controls an instruction input from a keyboard 209 provided for the host computer 101.

A display controller (DISPC) 206 controls display of a display module 210 (display) such as a liquid crystal display. A disk controller (DKC) 207 controls the hard disk (HD) 211. A network interface card (NIC) 208 interactively receives and transmits data to/from another node via the network 105.

Figure 3:
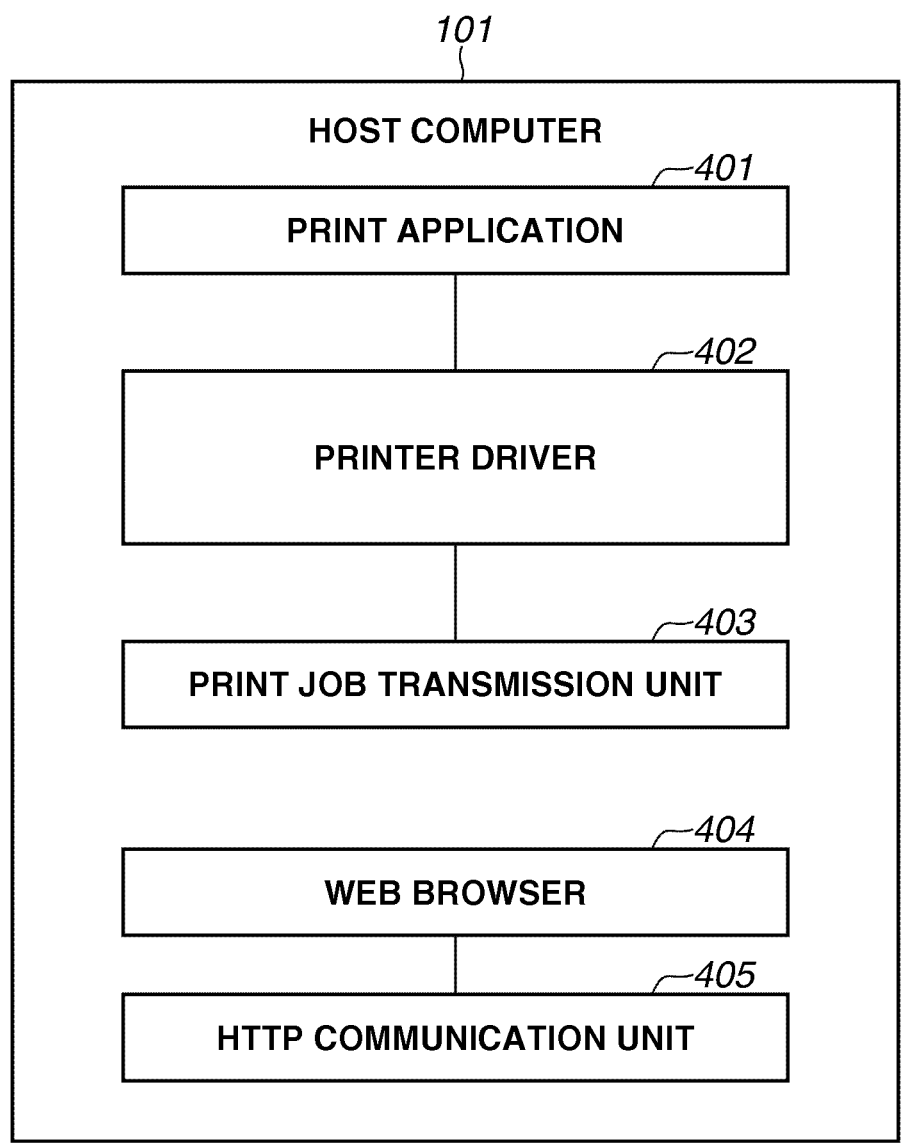
FIG. 3 is a block diagram illustrating a functional configuration example of the host computer.

FIG. 3 illustrates a functional configuration example of the host computer 101. The host computer 101 includes a print application 401, a printer driver 402, a print job transmission unit 403, a web browser 404, and a hypertext transfer protocol (HTTP) communication unit 405.

The print application 401 instructs printing by transmitting a drawing command to the printer driver 402. The printer driver 402 converts the drawing command received from the print application 401 to print data interpretable by the image forming apparatus, i.e., a page description language (PDL).

If device authentication is set, the printer driver 402 displays a user authentication dialog, and requests inputs of a user name and a password to the user required to use the image forming apparatus. The printer driver 402 transmits the user name and the password input to the image forming apparatus as the print destination via the network 105, and requests the authentication.

The image forming apparatus performs matching of the user name and the password with an authentication processing unit 612, and returns a response indicating whether the authentication is successful. If the authentication is not successful, the printer driver 402 cancels the printing. If the authentication is successful, the printer driver 402 creates the print job including the print data by using the user name input when the authentication is successful as job owner information.

If the device authentication is not set, the printer driver 402 adds the user name logged in the host computer 101 as the job owner information to the print job, and creates the print job.

The printer driver 402 sends the created print job to the print job transmission unit 403. The print job transmission unit 403 transmits the print job received from the printer driver 402 to the image forming apparatus.

The web browser 404 interprets hypertext markup language (HTML) data, draws data on a screen of the display module 210, receives a user operation from the keyboard 209, and transmits a request to the HTTP communication unit 405.

The HTTP communication unit 405 receives a communication request from the web browser 404, communicates with the image forming apparatus using an HTTP or an HTTPS via the NIC 208, requests a web page, and receives web page data.

An internal configuration of the management apparatus 104 is similar to that of the host computer 101 (refer to FIG. 2).

Figure 4:
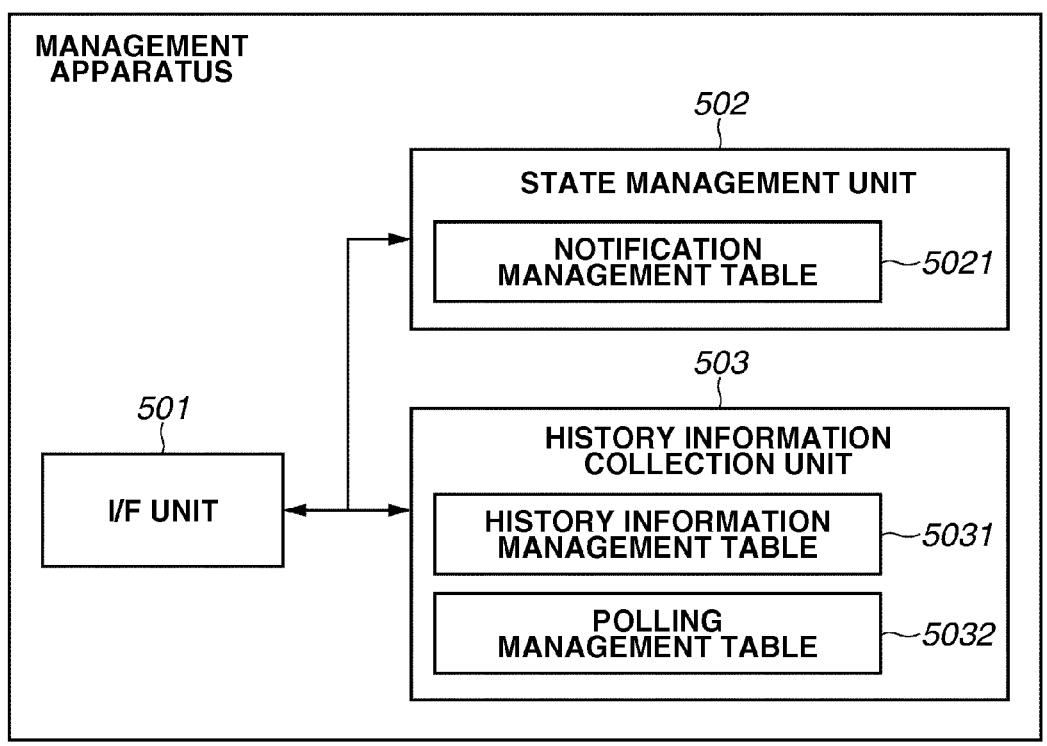
FIG. 4 is a block diagram illustrating a functional configuration example of a management apparatus.

FIG. 4 illustrates a functional configuration example of the management apparatus 104. The management apparatus 104 includes an interface (I/F) unit 501, a state management unit 502, and a history information collection unit 503. The interface unit 501 communicates with the image forming apparatus via the NIC 208 and the network 105.

The state management unit 502 receives a power state notification transmitted from the image forming apparatus, and stores and manages a reception history of the notification to a notification management table 5021. The state management unit 502 receives an inquiry of the power state of the image forming apparatus from the history information collection unit 503, then refers to the notification management table 5021, determines the power state, and sends a response.

The history information collection unit 503 collects the history information such as the job history from the image forming apparatus via the interface unit 501 with polling processing at a predetermined interval according to a schedule set by an administrator, and stores and manages the history information in a history information management table 5031.

When collecting the history information by the polling processing, time information such as year, month, day, and time, and the power state of the device before the polling processing are stored and managed in a polling management table 5032.

Figure 5:
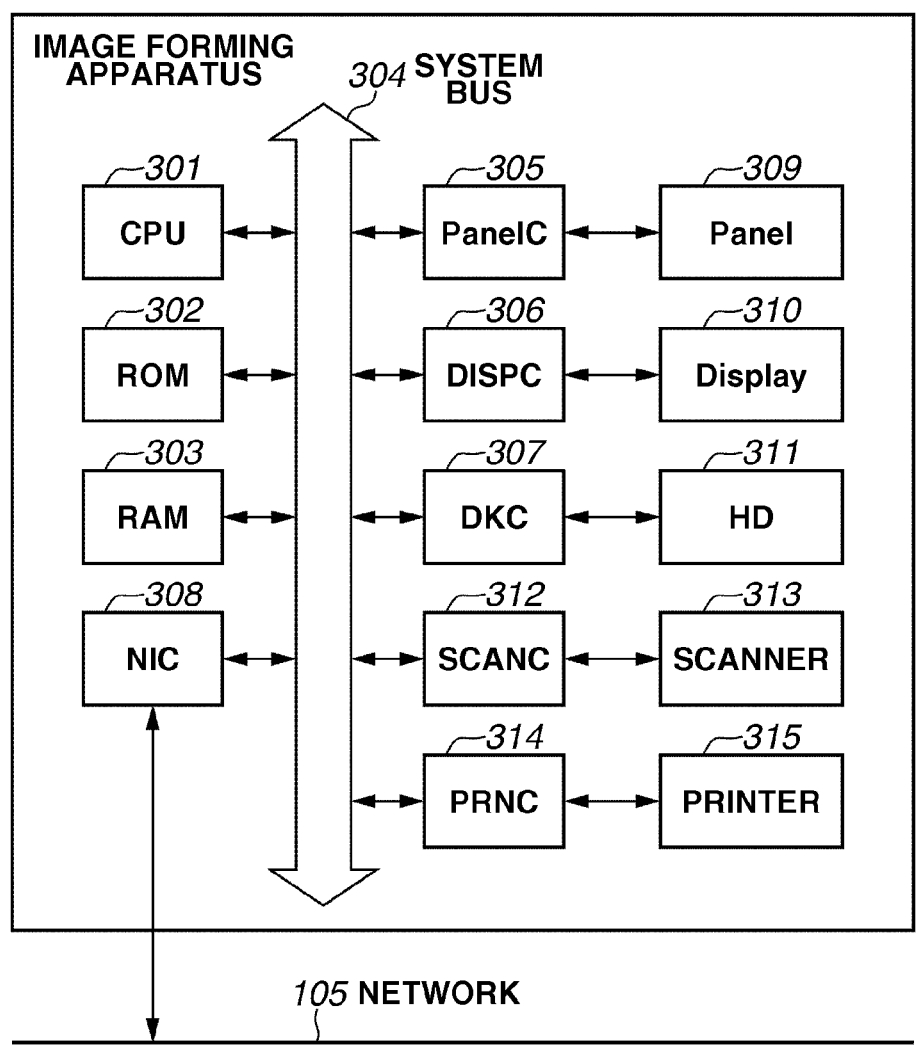
FIG. 5 is a block diagram illustrating an internal configuration of an image forming apparatus.

FIG. 5 illustrates an internal configuration (hardware configuration) of the multifunction peripheral 102 as an example of the image forming apparatus.

A CPU 301 executes software programs stored in a ROM 302 or a HD 311 as a large-scaled storage device, and collectively controls devices connected to a system bus 304. A RAM 303 functions as a main memory or a work area of the CPU 301.

A panel controller (PanelC) 305 controls an instruction input from an operation panel 309 provided on the image forming apparatus. A display controller (DISPC) 306 controls the display of a display module (DISPLAY) 310 such as a liquid crystal display.

A disk controller (DKC) 307 controls the hard disk (HD) 311 as the large-scale storage device. A network interface card (NIC) 308 receives or transmits data to/from another node via the network 105.

A scanner controller (SCANC) 312 controls an optical scanner 313 to read a paper document. A printer controller (PRNC) 314 controls a printer 315, and prints data on an actual sheet by using the well-known print technique such as the electrophotographic technique or the inkjet technique. The printer 103 has neither the scanner controller 312 nor the scanner 313 as the internal configuration.

Figure 6:
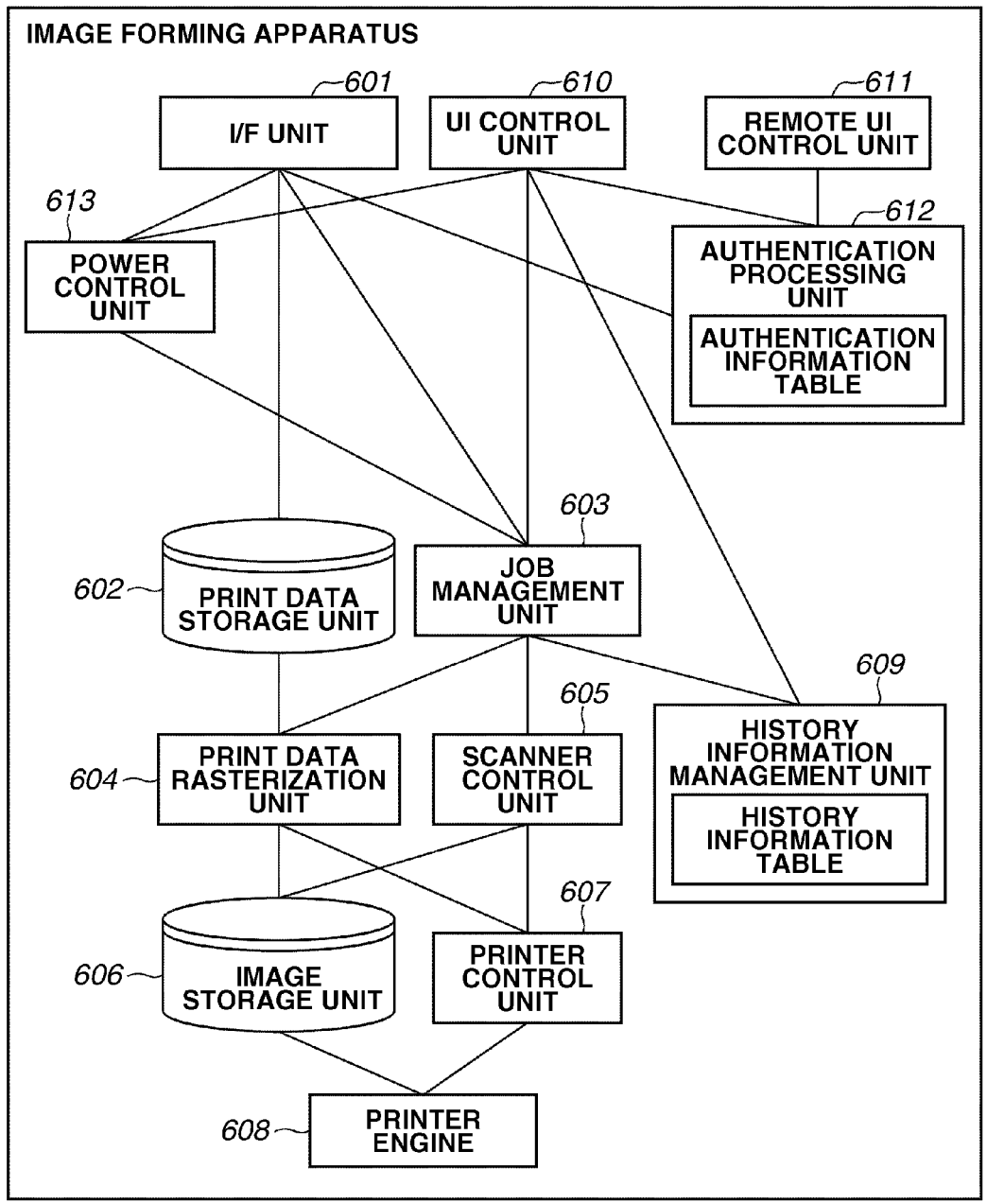
FIG. 6 is a block diagram illustrating a functional configuration example of the image forming apparatus.

FIG. 6 illustrates a functional configuration example of the image forming apparatus.

An interface unit 601 is connected to the network 105, and receives the print job from the host computer 101. A power state of the image forming apparatus is notified to the management apparatus 104. The interface unit 601 further receives an acquisition request of history information from the management apparatus 104, and transmits the history information. A print data storage unit 602 temporarily stores the print job in the RAM 303 or the hard disk 311.

A user interface (UI) control unit 610 controls the operation panel 309 via a panel controller 305, and receives a log-in request of the user to the image forming apparatus or an instruction of copy, scan and transmission, and FAX transmission. When receiving the log-in request from the user, the UI control unit 610 transmits authentication information such as a user name or a password to the authentication processing unit 612.

If the authentication is successful in the authentication processing unit 612, the UI control unit 610 receives an authentication identification (ID). Then, the UI control unit 610 stores the user name and the authentication ID until receiving a log-out request. If an instruction is received to perform a job such as copy by a user operation, the user name and the authentication ID are transmitted to the job management unit 603 together with the job issue request. After performing a log-out operation from the operation panel, the UI control unit 610 performs log-out processing.

The UI control unit 610 has a "time-out period" as operation setting information. If an operation is not performed on the operation panel within the time set in the "time-out period", the UI control unit 610 performs the log-out processing. A setting value of the "time-out period" can be referred to from an external personal computer (PC).

The UI control unit 610 sends the user name, the authentication ID, log-out factor information, and a log-out notification to the authentication processing unit 612 in the log-out processing, and deletes the authentication information and the authentication ID. An operation history of the UI control unit 610 can be managed as the history information.

The job management unit 603 analyzes various jobs, acquires the user name or processing contents (output attribute information such as a number of print copies or color print), and manages the acquired data as job information together with the start time of the job.

When a job instruction is issued from the operation panel, if the UI control unit 610 issues the job from the web browser 404, the processing contents and the user name are received from a remote UI control unit 611.

A print data rasterization unit 604 acquires the print job from the print data storage unit 602 according to the job information stored in the job management unit 603, performs image generation processing of the print job, and generates the image data.

A scanner control unit 605 controls the scanner controller 312, scans the paper document, and forms the scanned image data. An image storage unit 606 temporarily stores the image data generated by the print data rasterization unit 604 and the scanner control unit 605 to the RAM 303 or the hard disk 311 (HD).

The printer control unit 607 controls a printer engine 608 to print the image data stored in the image storage unit 606. The printer engine 608 prints the image data stored in the image storage unit 606 on a medium such as a print sheet by using the well-known print technique such as the electrophotographic technique or the inkjet technique.

The history information management unit 609 manages the history information containing the job executed by the image forming apparatus or a record on contents or a result of the operation, or time information.

The job management unit 603 transmits job information managed when ending the job, as a job history, to the history information management unit 609, and the history information management unit 609 stores the job information. The history information management unit 609 transmits the stored history information to the management apparatus 104 in response to a request therefrom.

A power control unit 613 controls the shift of the power states (power-OFF state, normal state (running state), and sleep state) of the image forming apparatus. The power control unit 613 monitors states of the job management unit 603, the interface unit 601, and the UI control unit 610. If satisfying a prescribed condition, the power control unit 613 shifts the power state to a power saving state such as the sleep state.

Under the prescribed condition, when the user performs a sleep shift operation, if a preset time elapses after there are not any jobs in progress of execution or in a standby state, there is no external request to the interface unit 601, and a preset time (second sleep shift time period) from the previous communication elapses.

In the image forming apparatus, the sleep shift time period set by the administrator elapses after there is no processing for execution, and the state automatically shifts to the power saving state (sleep state).

As an example of the sleep state, in the image forming apparatus, power is supplied only to a part of the interface unit 601 or a part of the UI control unit 610. If receiving a specific type communication packet in the sleep state, the interface unit 601 sends a notification to the power control unit 613, and the power control unit 613 shifts the power state to the normal state.

When detecting the user operation in the sleep state, the UI control unit 610 notifies the power control unit 613 thereof, and the power control unit 613 shifts the power state to the normal state.

When or before the power state of the image forming apparatus is changed, the power control unit 613 notifies the external device (host computer 101 or management apparatus 104) on the network of the power state via the interface unit 601.

Multi-cast transmission using a service location protocol (SLP) is an example of a notification protocol. A service advertise (SA) packet is extended, and a packet in which the address of the device is described in the URL and power state is described in the attribute is transmitted, thereby enabling notification of the power state of the image forming apparatus.

When the power of the image forming apparatus is turned on, the power control unit 613 and the interface unit 601 start. Thereafter, the change to the normal state (power state attribute "on") is notified to the external device.

When the power of the image forming apparatus is turned off, shut-down processing starts and the change to the power-OFF state (power state attribute "off") is notified to the external device before shutting down the power control unit 613 and the interface unit 601.

When the image forming apparatus shifts the power state to the sleep state, it is notified to the external device before the shift to the sleep state (power state attribute "sleep"). When the image forming apparatus returns from the sleep state to the normal mode, the notification is sent to the external device just after the shift to the normal state (power state attribute "wakeup").

FIG. 7 illustrates a history information management table 5031. As an example, the job history is described. A history identification (ID) 701 uniquely identifies the record included in the history information in the management system. A device ID 702 identifies the image forming apparatus. The device ID 702 is a media access control (MAC) address, an Internet protocol (IP) address, a device number, or a device name.

A type 703 contains a job type. Specifically, the type 703 contains print as a print request from the host computer 101, copy, scan, FAX, and a box print for printing a document stored in the image forming apparatus.

In a page number 706, the number of pages processed by the job is recorded. When a job having four pages is printed, "4" is recorded. A document name 707 contains a document name set by the job by the print application 401 or a document name of a document stored in the image forming apparatus. In particular, a value is omitted ("-" in the table) for the job to which a document name is not set.

The history information can contain information of a user who instructs to execute the job, setting information such as color/monochrome, and an end state indicating normal/abnormal as well as the information described in the present exemplary embodiment.

The history information table stored in the history information management unit 609 in the image forming apparatus has a structure in which the device ID 702 is excluded from the table structure in FIG. 7.

Figure 8:
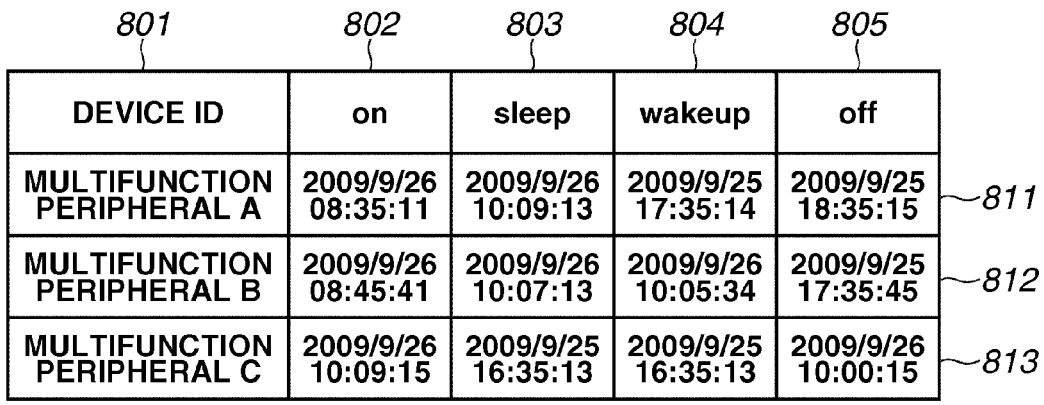
FIG. 8 illustrates an example of a notification management table.

FIG. 8 illustrates a notification management table 5021. A device ID 801 identifies the image forming apparatus.

An "on" 802 is used for recording the time information when the management apparatus 104 finally receives the power-ON notification from the image forming apparatus for each device. A "sleep" 803 is used for recording the time information when the management apparatus 104 finally receives the sleep shift notification from the image forming apparatus for each device.

A "wakeup" 804 is used for recording the time information when the management apparatus 104 finally receives a sleep return notification from the image forming apparatus for each device. An "off" 805 is used for recording the time information when the management apparatus 104 finally receives the power-OFF notification from the image forming apparatus for each device.

A row 811 is used for recording the time information (time) when the management apparatus 104 finally receives the power state notification from a multifunction peripheral A, and each row indicates the following.

Time when the power-ON notification is finally received: 08:35:11, Sep. 26, 2009

Time when the sleep shift notification is finally received: 10:09:13, Sep. 26, 2009

Time when the sleep return notification is finally received: 17:35:14, Sep. 25, 2009

Time when the power-OFF notification is finally received: 18:35:15, Sep. 25, 2009

The control by the management apparatus 104, in a case where data is recorded in the notification management table 5021 when the management apparatus 104 has received the power state notification, is described below. The management apparatus 104 waits for reception of the power state notification transmitted from the image forming apparatus via the SLP multi-cast to the interface unit 501. When the interface unit 501 receives the SLP multi-cast transmission, the received data is transmitted to the state management unit 502.

The state management unit 502 analyzes the received data, and extracts address information and the power state of the image forming apparatus from the attribute data of the received data. Then, the state management unit 502 records the time information in a column corresponding to the extracted power state of the row of the image forming apparatus corresponding to the device ID specified from the address information in the notification management table 5021. As the recorded time information, the current time based on a clock managed by the management apparatus 104 is used.

FIG. 9 illustrates a polling management table 5032. A device ID 901 is used for identifying the image forming apparatus.

In final polling 902, the management apparatus 104 performs the processing for acquiring the history information with the polling processing for the image forming apparatus indicated by the device ID 901, and records a normal end time of the processing as the time information. If the history information is not acquired because the image forming apparatus is in the sleep state or the power-OFF state or the acquisition fails, the data is not updated.

The processing for acquiring the history information is performed above, however, if there is not the history information to be acquired in the image forming apparatus, the processing is performed similarly to the normal end. The history information to be acquired is, e.g., non-acquired history information that has not been collected by the management apparatus 104 yet or the history information that is preset as a collection target.

In a pre-polling state 903, the state of the image forming apparatus before the acquisition processing is recorded at the normal end of the processing for acquiring the history information by the management apparatus 104. The pre-polling state 903 includes running (normal state) and sleep (sleep state).

Figure 10:
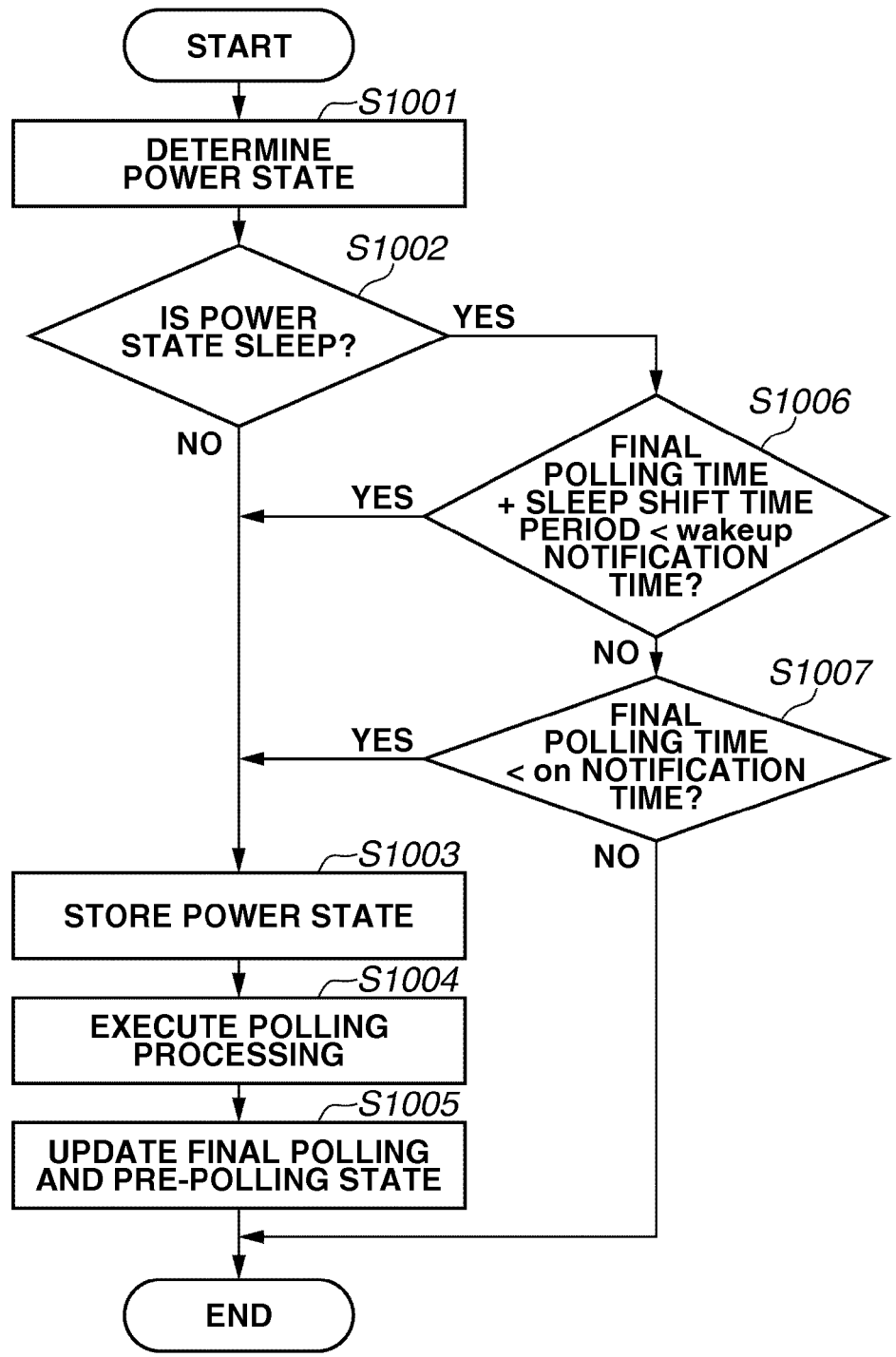
FIG. 10 is a flowchart illustrating processing for acquiring history information of the management apparatus.

FIG. 10 is a flowchart illustrating processing for collecting the history information of the management apparatus 104 according to the first exemplary embodiment.

The history information collection unit 503 in the management apparatus 104 communicates with the image forming apparatus via the interface unit 501 at a prescribed time interval, and requests the history information managed by the history information management unit 609, as the polling processing. The history information acquired in response to the request is recorded to the history information management table 5031 in FIG. 7, and is stored in the history information collection unit 503.

The control of the history information collection unit 503 that performs the polling processing by the history information management unit 609, is described with reference to FIG. 10. The processing is executed for each image forming apparatus of a management target at a prescribed time interval set to each apparatus.

In step S1001, the history information management unit 609 determines the power state of the image forming apparatus as a polling target. A row corresponding to the image forming apparatus as the target is acquired from the notification management table 5021 in FIG. 8. The notification at the final time is searched for, thereby determining the power state of the image forming apparatus as the target.

In the case of the multifunction peripheral A in FIG. 8, the notification at the final time is the "sleep" notification at 10:09:13, Sep. 26, 2009. Therefore, the current power state of the multifunction peripheral A is determined as the sleep state.

In step S1002, it is determined whether the power state is the sleep state based on the determination in step S1001. If the power state is the sleep state (YES in step S1002), the processing proceeds to step S1006. If the power state is not the sleep state (NO in step S1002), it is determined that the polling processing is to be executed, and the processing proceeds to step S1003.

In step S1003, the history information collection unit 503 temporarily stores the power state of the image forming apparatus as the target. In step S1004, the history information collection unit 503 communicates with the image forming apparatus as the target, and requests the history information, thereby executing the polling processing. When the history information is acquired, the history information is recorded to the history information management table 5031 in FIG. 7.

In step S1005, the history information collection unit 503 updates the final polling 902 in the image forming apparatus as the target in the polling management table 5032 in FIG. 9 with the current time, and further updates the pre-polling state 903 with the power state temporarily stored in step S1004. Then, the processing for collecting the history information of the management apparatus 104 ends.

According to the present exemplary embodiment, at the timing for executing the polling processing, it is considered that the history information in the image forming apparatus is not updated after the previous acquisition and there is not the history information that has not been acquired.

When the image forming apparatus is in the sleep state, if executing the polling processing despite the absence of the history information that has not been acquired, the image forming apparatus is returned from the sleep state, thereby causing the power saving advantage to be reduced. According to the present invention, when the image forming apparatus is in the sleep state, processing in steps S1006 and S1007 is performed, and the polling processing is executed when it is determined that there is a high possibility of the presence of the history information that has not been acquired.

In step S1006, the history information management unit 609 acquires the time information of the final polling of the image forming apparatus as the target from the polling management table 5032 in FIG. 9, and refers to the time information in a wakeup column of the image forming apparatus as the target from the notification management table 5021 in FIG. 8.

The time when the sleep shift time period of the image forming apparatus as the target has elapsed from the time indicated by the time information of the final polling, is compared with the time indicated by the time information of the wakeup row. If (time of final polling+sleep shift time period)<(time when receiving wakeup notification) as a comparison result (YES in step S1006), the processing proceeds to step S1003. Otherwise (NO in step S1006), the processing proceeds to step S1007.

The sleep shift time period indicates the time period waited for automatic shift to the power saving state (sleep state) under the control of the power state control unit 613 when the image forming apparatus satisfies a prescribed condition during the time.

The sleep shift time period is set by the administrator or is set in advance as a specification of each image forming apparatus. The sleep shift time period is generally set to a time period (several tens of seconds to several minutes) much shorter than the polling interval of the management apparatus 104.

According to the present exemplary embodiment, in step S1006, the sleep shift time period from the time when any request has not come from outside to when the automatic shift to the sleep state is performed, which is caused by no communication, is used for comparison and determination, among the sleep shift time periods caused by various reasons.

When the image forming apparatus is in the sleep state at the time of the current polling processing, the present embodiment determines that the sleep state shifted after the previous polling processing is returned to the normal state once or more in response to a processing request of the apparatus other than the management apparatus 104, such as the host computer 101.

Specifically, referring to FIG. 12A, after a timing (P1) of the previous polling processing, the management apparatus 104 receives a sleep shift notification (S_in1). The management apparatus 104 then reaches the current polling processing timing (P2) without receiving the return notification.

Referring to FIG. 12B, after the timing (P1) of the previous polling processing, the management apparatus 104 sequentially receives the sleep shift notification (S_in1), a return notification (W_up), and a sleep shift notification (S_in2). The management apparatus 104 then reaches the current polling processing timing (P2).

In the example illustrated in FIG. 12B, with high possibility, any processing is executed when the image forming apparatus is returned, and the history information is updated.

In step S1007, the history information management unit 609 acquires the time information of the final polling 902 of the image forming apparatus as the target from the polling management table 5032 in FIG. 9, and refers to the time information in an on-column of the image forming apparatus as the target in the notification management table 5021 in FIG. 8.

If (time of final polling)<(time of receiving on-notification) (YES in step S1007) as a comparison result, the processing proceeds to step S1003. Otherwise (NO in step S1007), the processing for collecting the history information of the management apparatus 104 ends.

If the on-notification is received after the final polling (YES in step S1007), the power of the image forming apparatus is OFF or ON after the previous polling processing. For example, that is the case illustrated in FIG. 12C.

Referring to FIG. 12C, the job is likely to be executed after/before a timing (e.g., a period X in FIG. 12C) of the power-OFF state after executing the previous polling processing. According to the present exemplary embodiment, the history information is updated in the image forming apparatus, and there can be the history information that has not been acquired. Therefore, even if the image forming apparatus is returned from the sleep state, it is determined that the polling processing is to be executed.

According to the present exemplary embodiment, if the history information is likely to be updated in the image forming apparatus after the previous polling processing, even if the image forming apparatus is in the power saving state, the history information of the polling processing is collected.

If it is determined that the history information is not updated in the image forming apparatus after the previous polling processing, the polling processing of the image forming apparatus is not performed. According to the present exemplary embodiment, as a consequence, the real-time property is ensured in the history management in the management apparatus 104 in consideration of power saving of the image forming apparatus.

Figure 11:
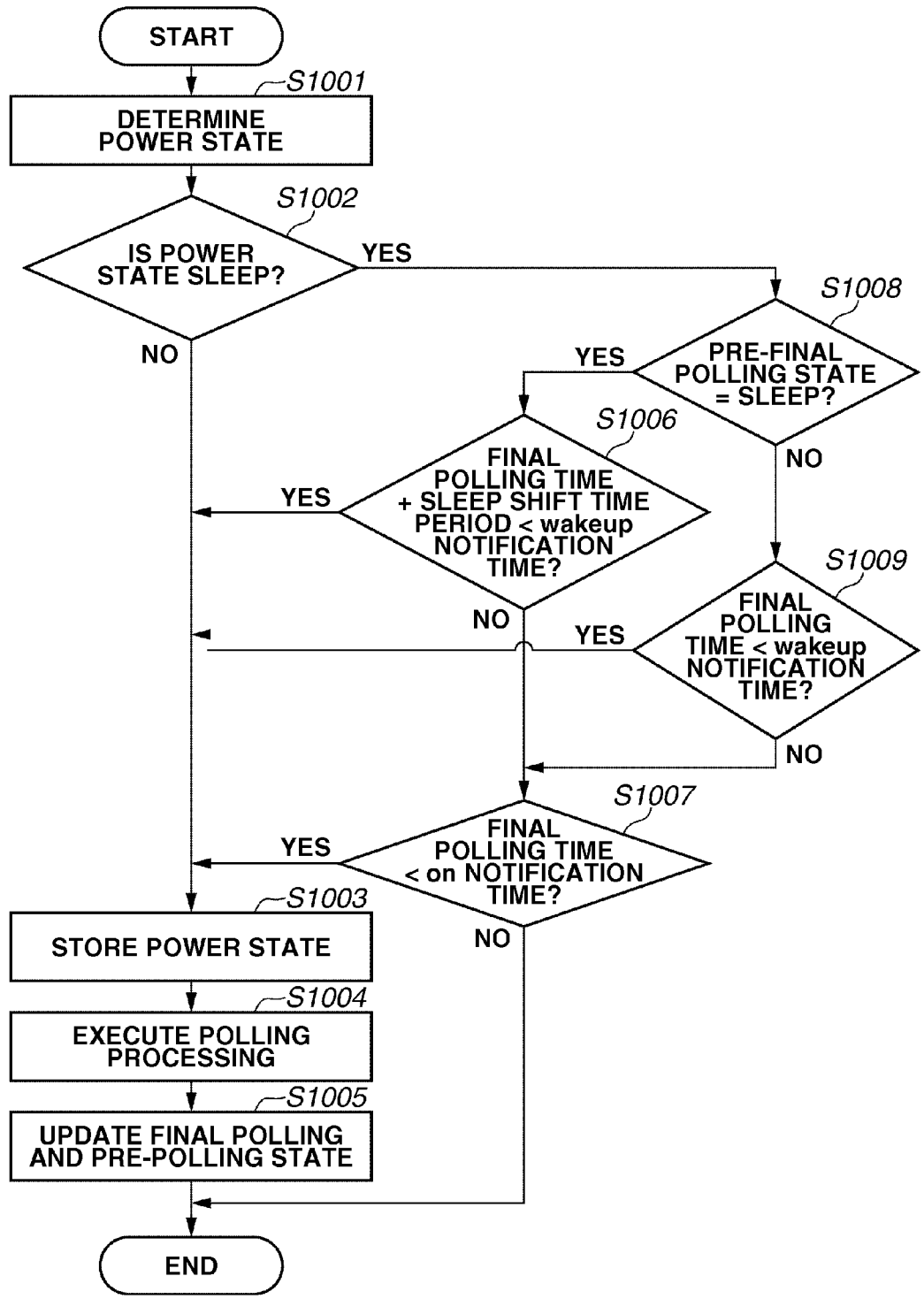
FIG. 11 is a flowchart illustrating processing for acquiring history information of a management apparatus according to a second exemplary embodiment of the present invention.

FIG. 11 is a flowchart illustrating the polling processing for acquiring the history information of the management apparatus 104 according to a second exemplary embodiment of the present invention.

According to the present exemplary embodiment, processing in steps S1008 and S1009 is further performed in addition to the processing in FIG. 10 in order to prevent the return from the sleep state with the polling processing at the timing at which there is not the history information that has not been acquired. Processing of the history information management unit 609, different from that of the first exemplary embodiment, will be described.

In step S1002, it is determined whether the power state is the sleep state as a result of the determination in step S1001. If the power state is the sleep state (YES in step S1002) the processing proceeds to step S1008. If the power state is not the sleep state (NO in step S1002), it is determined that the polling processing is to be executed, and the processing proceeds to step S1003.

In step S1008, the history information management unit 609 acquires the pre-polling state 903 of the image forming apparatus as the target from the polling management table 5032 in FIG. 9. If the pre-polling state 903 is the sleep state (YES in step S1008), the processing proceeds to step S1006. If the pre-polling state 903 is not the sleep state (NO in step S1008), the processing proceeds to step S1009.

According to the second exemplary embodiment, before performing determination of step S1006, it is determined whether the state (pre-polling state 903) of the image forming apparatus in the previous polling processing is the sleep state. This indicates that the image forming apparatus is returned from the sleep state, particularly caused by the previous polling processing.

Referring to FIG. 12D, depending on the processes of the image forming apparatus or the operation of a thread, a return notification from the image forming apparatus can be transmitted after the end of the previous polling processing of the management apparatus 104.

It is assumed that "time of final polling" is compared with "time of wakeup notification" and it is determined whether the history information is likely to be updated in the image forming apparatus after the previous polling processing.

Referring to FIG. 12D, it is erroneously recognized that a wakeup notification from the image forming apparatus corresponding to the previous polling processing is the return from the sleep state shifted after the previous polling processing.

As described above, the power state control unit 613 performs control to automatically shift the state of the image forming apparatus to the sleep state after the elapse of the sleep shift time period caused by no communication after the end of the polling processing. Therefore, the state of the image forming apparatus cannot shift to the sleep state and return from the sleep state again within the sleep shift time period from the time of the previous polling processing.

By utilizing the characteristics, in step S1006, "time of final polling+sleep shift time period" is compared with "time of receiving wakeup notification", thereby preventing the erroneous recognition in the case in FIG. 12D. However, depending on a type of an image forming apparatus, the return notification from the image forming apparatus may not be transmitted after the end of the previous polling processing of the management apparatus 104. In the case, it is not necessary to consider the sleep shift time period about the process in the step S1006.

If the state (pre-polling state) of the image forming apparatus is not the sleep state in the previous polling processing (NO in step S1008), the sleep shift time period may not to be considered.

In step S1009, the "time of final polling" is compared with the "time of receiving wakeup notification", thereby determining whether the history information is likely to be updated in the image forming apparatus after the previous polling processing. If the "time of final polling"<"time for receiving wakeup notification" (YES in step S1009), the processing proceeds to step S1003. Otherwise (NO in step S1009), the processing proceeds to step S1007.

The subsequent processing is similar to that in FIG. 10 according to the first exemplary embodiment. Therefore, the description thereof is omitted.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-114762 filed May 23, 2011, which is hereby incorporated by reference herein in its entirety.

What is claimed is:

1. A management apparatus that manages history information acquired by issuing a request to an image forming apparatus, the management apparatus comprising:
   a reception unit configured to receive, from the image forming apparatus, a shift notification indicating a shift to a power saving state and a return notification indicating return from the power saving state;
   a request unit configured to request history information from the image forming apparatus, the history information indicating a history of a job executed by the image forming apparatus;

a history information management unit configured to manage the history information acquired in response to the request;

a management unit configured to manage shift time information indicating when the state of the image forming apparatus is shifted to the power saving state according to the received shift notification, return time information indicating when the state of the image forming apparatus is returned from the power saving state according to the received return notification, and request time information indicating when the history information is requested to the image forming apparatus;

a specification unit configured to specify whether the image forming apparatus is in the power saving state by referring to the shift time information and the return time information, managed by the management unit; and a control unit configured to control whether the request unit issues the request when the specification unit specifies that the image forming apparatus as an acquisition target of the history information is in the power saving state, wherein the control unit is configured to perform control so as to issue the request by the request unit in the power saving state of the image forming apparatus in the case that the return time information and the request time information indicate that the return notification was issued after a previous request for history information was issued to the image forming apparatus, and to perform control so as not to issue the request by the request unit in the case that the return time information and the request time information indicate that the return notification was not issued after a previous request for history information was issued to the image forming apparatus.

2. The management apparatus according to claim 1, wherein the reception unit is configured to further receive, from the image forming apparatus, a power-ON notification indicating that power is ON, wherein the management unit is configured to further manage power-ON time information indicating when the power of the image forming apparatus is ON according to the received power-ON notification, and wherein the control unit is configured to perform control, in the case that the image forming apparatus has not issued the return notification after a previous request for history information was issued to the image forming apparatus, so as to issue the request by the request unit in the power saving state of the image forming apparatus in the case that the power_ON time information and the request time information indicate that the power-ON notification was issued after a previous request for history information was issued to the image forming apparatus, and to perform control so as not to issue the request by the request unit in the case that the power-ON time information and the request time information indicate that the power-ON notification was not issued after a previous request for history information was issued to the image forming apparatus.

3. The management apparatus according to claim 1, further comprising a storage unit configured to store a sleep shift time period after which the state of the image forming apparatus is shifted to the sleep state, wherein the management unit is configured to manage whether the state of the image forming apparatus when the history information is requested is in the power saving state, and wherein, in the case where the management unit manages that the image forming apparatus when issuing a previous request for history information is in the power saving state when the specification unit specifies that the image forming apparatus is in the power saving state, the control unit is configured to perform control so as to issue the request by the request unit in the power saving state of the image forming apparatus, in the case that the request time information, the return time information and the sleep shift time period indicate that the return notification was issued by the image forming apparatus after a previous request for history information was performed and the sleep shift time period elapses, and to perform control so as not to issue the request by the request unit in the case that the request time information, the return time information and the sleep shift time period indicate that the return notification was not issued after a previous request for history information of the image forming apparatus was issued and the sleep shift time period elapses.

4. The management apparatus according to claim 3, wherein the sleep shift time period is a time period from when a last request has come to the image forming apparatus to when an automatic shift to the sleep state is performed.

5. A method for a management apparatus for managing history information acquired from an image forming apparatus based on a request, the method comprising:

receiving from the image forming apparatus a shift notification indicating a state of the image forming apparatus is shifted to a power saving state and a return notification indicating that a the state of the image forming apparatus is returned from the power saving state;

requesting history information from the image forming apparatus, the history information indicating a history of a job executed by the image forming apparatus;

managing the history information acquired in response to the request;

managing shift time information indicating when the state of the image forming apparatus is shifted to the power saving state according to the received shift notification, return time information indicating when the state of the image forming apparatus is returned from the power saving state according to the received return notification, and request time information indicating when the history information is requested from the image forming apparatus;

specifying whether the image forming apparatus is in the power saving state by referring to the shift time information and the return time information; and controlling whether to issue the request of the history information to the image forming apparatus when the image forming apparatus as an acquisition target of the history information is specified to be in the power saving mode, wherein the request is issued in the power saving state of the image forming apparatus in the case that the return time information and the request time information indicate that the return notification was issued after a previous request for history information was issued to the image forming apparatus, and wherein the request is not issued in the case that the return time information and the request time information indicate that the return notification was not issued after a previous request for history information was issued to the image forming apparatus.

6. A non-transitory computer readable storage medium on which is stored a computer program for causing a computer to execute a method for a management apparatus managing history information acquired from an image forming apparatus based on a request, the method comprising:

receiving from the image forming apparatus a shift notification indicating a state of the image forming apparatus is shifted to a power saving state and a return notification indicating that a the state of the image forming apparatus is returned from the power saving state;

requesting history information from the image forming apparatus, the history information indicating a history of a job executed by the image forming apparatus;

managing the history information acquired in response to the request;

managing shift time information indicating when the state of the image forming apparatus is shifted to the power saving state according to the received shift notification, return time information indicating when the state of the image forming apparatus is returned from the power saving state according to the received return notification, and request time information indicating when the history information is requested from the image forming apparatus;

specifying whether the image forming apparatus is in the power saving state by referring to the shift time information and the return time information; and controlling whether to issue the request of the history information to the image forming apparatus when the image forming apparatus as an acquisition target of the history information is specified to be in the power saving mode, wherein the request is issued in the power saving state of the image forming apparatus in the case that the return time information and the request time information indicate that the return notification was issued after a previous request for history information was issued to the image forming apparatus, and wherein the request is not issued in the case that the return time information and the request time information indicate that the return notification was not issued after a previous request for history information was issued to the image forming apparatus.

* * * * *